(12) United States Patent
Maiolani et al.

(10) Patent No.: US 6,434,698 B1
(45) Date of Patent: Aug. 13, 2002

(54) DISTRIBUTED PROCESSOR SYSTEM HAVING STATUS VOTING MECHANISM OF EACH PROCESSOR BY ALL OTHER PROCESSORS AND METHOD THEREFOR

(75) Inventors: Mark Maiolani, Busby; Mark Jordan, Netherburn, both of (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/469,405

(22) Filed: Dec. 22, 1999

(30) Foreign Application Priority Data

Dec. 23, 1998 (GB) .............................................. 9828531

(51) Int. Cl.⁷ ................................................ G06F 9/00
(52) U.S. Cl. ................................................ 713/2; 713/1
(58) Field of Search ......................................... 713/2, 1

(56) References Cited

U.S. PATENT DOCUMENTS

| | | | |
|---|---|---|---|
| 4,570,261 A | | 2/1986 | Maher ............................ 371/16 |
| 4,972,415 A | * | 11/1990 | Walter et al. ................. 714/797 |
| 5,640,504 A | * | 6/1997 | Johnson, Jr. ..................... 714/4 |
| 5,761,414 A | | 6/1998 | Akaishi et al. .......... 395/185.08 |
| 6,012,154 A | * | 1/2000 | Poisner ........................... 714/55 |
| 6,061,788 A | * | 5/2000 | Reynaud et al. ................. 713/2 |

FOREIGN PATENT DOCUMENTS

| EP | 0 348 663 A3 | 1/1990 | ............ G06F/11/00 |
| EP | 0 348 663 A2 | 1/1990 | ............ G06F/11/00 |
| EP | 0 524 014 A2 | 1/1993 | ............ G06F/11/00 |

OTHER PUBLICATIONS

UK Search Report (1pg.).
Tony P. Ng, "The Design and Implementation of a Reliable Distributed Operating System", 1990 IEEE, pp. 2–11.
PCT International Search Rpt., Apr. 26, 2000.

* cited by examiner

Primary Examiner—Dennis M. Butler

(57) ABSTRACT

A microprocessor module is arranged to be coupled to a communications network having a number of distributed modules. Each module is arranged to transmit status signals relating to the status of other modules. The microprocessor module includes a microcontroller arranged to control functions of the module and a reset arrangement coupled to the network and arranged for providing a reset signal to reset the microcontroller in dependence upon a reset condition. The reset condition is determined by a voting scheme applied to the status signals received from the plurality of modules.

14 Claims, 2 Drawing Sheets

DISTRIBUTED PROCESSOR SYSTEM HAVING STATUS VOTING MECHANISM OF EACH PROCESSOR BY ALL OTHER PROCESSORS AND METHOD THEREFOR

FIELD OF THE INVENTION

This invention relates to microprocessor modules, and particularly but not exclusively to such modules in distributed multi-processor systems.

BACKGROUND OF THE INVENTION

Distributed multi-processor systems (having a system bus and a number of distributed processors at nodes of the bus), are increasingly used in the automobile industry for providing distributed functions within a vehicle. Many applications of such a system (for example an Electro-Mechanical Braking (EMB) System or 'Brake-by-Wire') are safety critical and a high level of dependency is typically designed into the nodes of the system bus.

One example of this dependency is an arrangement where processors of each node redundantly perform tasks which mirror tasks of the other nodes' processors, and then cross-checks with the other processors via the system bus. If a processor is faulty, it will in some instances recognise the fault due to the cross-checking with the other processors, and then perform corrective actions to partially or completely recover from the fault.

However, a problem exists in instances when the faulty processor does not recognise that it has been identified by the other processors as faulty, either due to an internal error or an error relating to the communication with the system bus. Even if such an error is detected, in some instances the faulty processor is not able to perform corrective actions under software control.

In either of these cases the processor and hence the node may suffer from reduced or incorrect operation, which in a safety critical application could have fatal results. This invention seeks to provide a microprocessor module and method which mitigate the above mentioned disadvantages.

SUMMARY OF THE INVENTION

According to a first aspect of the present invention there is provided a microprocessor module arranged to be coupled to a communications network having a plurality of distributed modules, the distributed modules being arranged to transmit status signals pertaining to the perceived status of the module, the module comprising: a reset arrangement coupled to the network and arranged for providing a reset signal to reset the module in dependence upon a reset condition, wherein the reset condition is determined by a voting scheme applied to the status signals received from the plurality of modules.

According to a second aspect of the present invention there is provided a method of resetting a microprocessor module, the module arranged to be coupled to a communications network having a plurality of distributed modules, the method comprising: receiving status signals from the distributed modules pertaining to the perceived status of the module; applying a voting scheme to the received status information to determine whether a reset condition is met; and, providing a reset signal to reset the module in dependence upon the reset condition being met.

Preferably the status information comprises indications from the plurality of modules as to whether the microprocessor module appears to be faulty. The voting scheme preferably comprises a summation of the indications and a comparison of the summed indications with a threshold value in order to determine whether the reset condition is met.

The reset arrangement is preferably further arranged to provide an interrupt request signal to the microcontroller in dependence upon an interrupt request condition. Preferably the interrupt request condition is determined according to the voting scheme. Preferably the reset condition is determined in dependence upon a predetermined number of interrupt request conditions being met.

The interrupt request is preferably non-maskable. The module or method is preferably further arranged to provide status signals to the communications network indicating the perceived status of the plurality of modules.

In this way a microprocessor module and method are provided in which a faulty module can be reset remotely, based on 'votes' cast by other modules of the system, even though the module itself may not be able to rectify the fault.

BRIEF DESCRIPTION OF THE DRAWINGS

An exemplary embodiment of the invention will now be described with reference to the drawing in which.

DETAILED DESCRIPTION OF A PREFERRED EMBODIMENT

Figure 1:
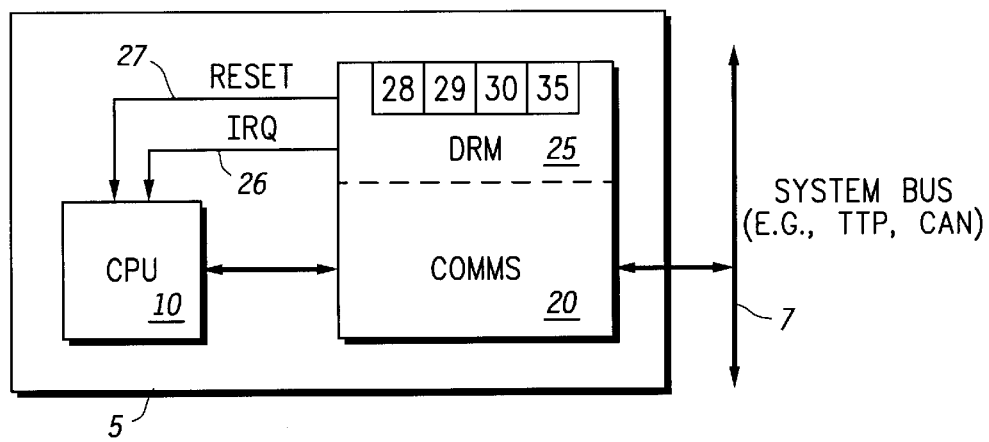
FIG. 1 shows a preferred embodiment of a microprocessor arrangement in accordance with the invention.

Referring to FIG. 1, there is shown a microprocessor arrangement 5 arranged to be coupled to a system bus 7 of a distributed multi-processor system (not shown), such as a so-called brake-by-wire vehicle braking system. In such a system a pedal module or node including a microprocessor is connected to a brake pedal, and a number of brake modules or nodes (including microprocessors) are each connected to a brake assembly of a vehicle wheel. The modules/nodes are arranged to communicate with each other via the system bus.

The microprocessor arrangement 5 could be a pedal or wheel node, and includes a Central Processing Unit (CPU) 10 and a Network Communications Controller (NCC) 20, incorporating a Distributed Reset Module (DRM) 25. The NCC 20 is arranged to provide an interface between the CPU 10 and the system bus 7, for exchanging data therebetween.

"The DRM 25 has an interrupt request line IRQ 26 and a reset line RESET 27, coupled to the CPU 10. The IRQ line 26 is arranged to send a non-maskable level of interrupt request to the CPU 10, such that if the CPU 10 has not completely failed, it will be forced to respond to a signal on the IRQ line 26. The IRQ line 26 and RESET line 27 are further described below. The DRM 25 also has a vote register 28, a threshold register 29, a comparator 30 and a Reset Down Counter (RDC) 35, to be further described below."

Figure 2:
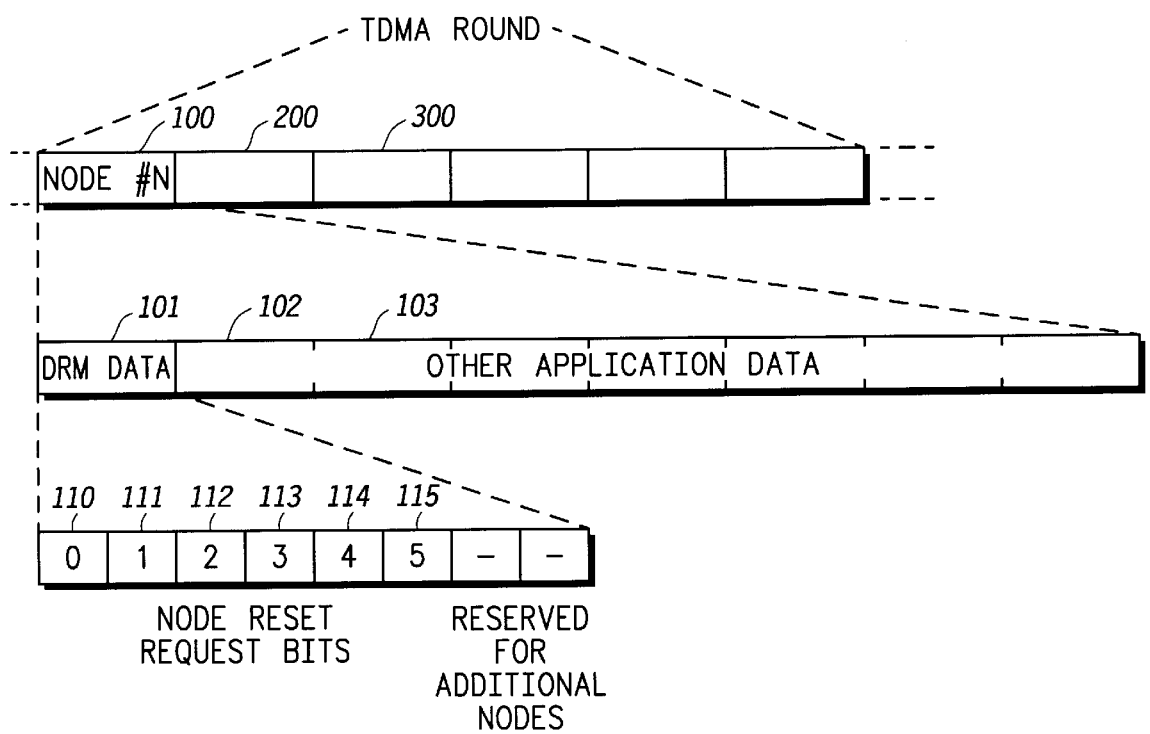
FIG. 2 shows a typical timing arrangement for use with the arrangement of FIG. 1; and, FIG. 3 shows a voting arrangement relating to the timing arrangement of FIG. 2.

In operation, and referring now also to FIG. 2, there is shown a timing arrangement of the system bus 7. In each timing round 50 of the system, there are n time slots (100, 200, 300) where n is the number of nodes of the system. Each slot is dedicated to a particular node, and in this case slot 100 is notionally dedicated to the microprocessor arrangement 5. Within the slot 100 there are packets of data pertaining to different functions of the system, such as data instructions and requests. A DRM packet slot 101 is reserved for the microprocessor 5 to write status data relating to the operation of each node, with other packet slots (102, 103) reserved for other functions.

Within the DRM packet slot 101 there are a number of defined data bit slots (110, 111, 112, 113 etc.) which are node reset request bits relating to each node of the system. The microprocessor 5 is arranged to monitor itself and to monitor the system bus 7 for data relating to the other nodes of the system, and to process that data in order to determine whether the other nodes appear to be functioning correctly. If a particular node is considered to be functioning correctly, a logic value zero (0) is written to the system bus 7 during the data bit slot of that node. If a particular node is considered to be functioning incorrectly, a logic value one (1) is written to the system bus 7 during the data bit slot of that node. The microprocessor 5 also writes a value for the data bit slot relating to itself.

Figure 3:
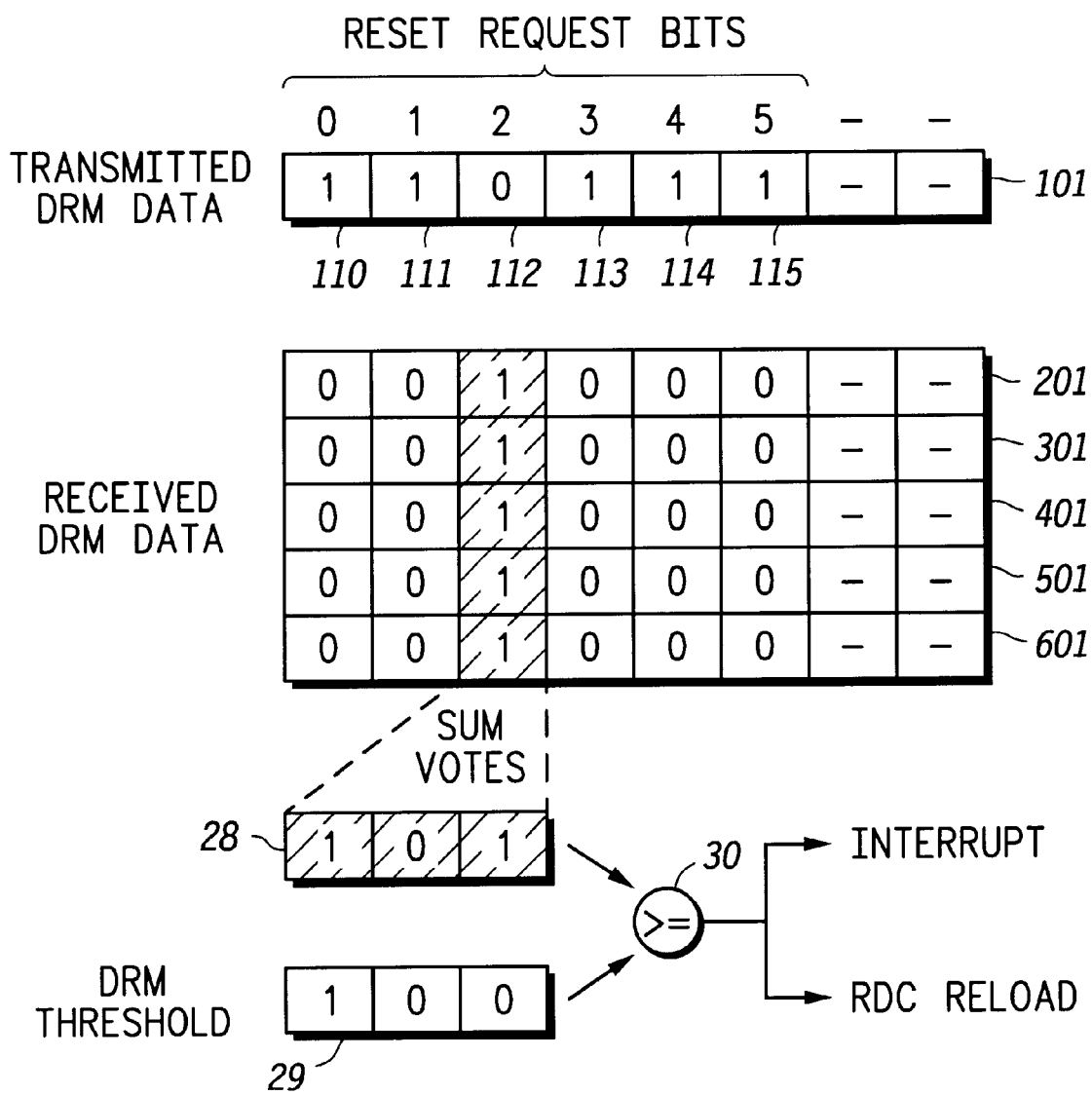

Referring now also to FIG. 3, if the number of nodes n=6, for the slot 100 dedicated to node 1, the data of bit slots 110–115 represents the status of the nodes of the system (nodes 0 to 5) as perceived by the microprocessor 5. In this case the microprocessor 5 is node 2 (slot 112), and the other nodes of the system are nodes 0, 1, 3, 4 and 5 (slots 110, 111, 113, 114 and 115).

In the event that the microprocessor 5 is faulty, it may be that this is not recognised internally. Hence logical 0 is written into slot 112. For the other slots, since the microprocessor 5 is faulty, it may find a discrepancy with the data relating to the other nodes, and determine that all of these other nodes are faulty. Hence logical 1 is written into slots 110, 111, 113, 114 and 115.

Each of the other nodes of the system perform the same operation, and provide status data in their respective DRM packet slots 201–601. In this way each node 'votes' on which nodes appear faulty and which nodes appear to be functioning correctly. In this case it can be seen that each of the other nodes considers that node 2 is faulty and all other nodes are functioning correctly. The number of 'votes' against node 2 total 5 (binary value '101'), and this number is stored in the vote register 28 within the DRM module 25. This number is then compared to a threshold value which is stored in the threshold register 29 within the DRM module 25. The threshold value is determined during configuration of the system, and is chosen in accordance with the total number of nodes of the system and the fault sensitivity required of the system. In this case given that the total number of nodes is 6, the threshold value is chosen to be four (binary value '100'), as four represents a majority vote.

The comparison is performed using the comparator 30, which is preferably implemented in hardware, and if the number stored in the vote register 28 is equal to or exceeds that stored in the threshold register 29, then the comparator 30 causes the DRM module 25 to send an interrupt request signal to the CPU using the IRQ line 26. At the same time, a signal is sent to the Reset Down Counter (RDC) 35, which is decremented by one.

The RDC has a predetermined starting value (for example the value 3). The purpose of the RDC is to provide a number of opportunities for the DRM module 25 to rectify a fault in the CPU 10 by an IRQ signal on the IRQ line 26, before resorting to the more forceful RESET signal, using the RESET line 27. Therefore with the RDC having an initial value of 3, there will be up to three attempts to rectify the fault in the CPU 10 using an IRQ signal, before resorting to a RESET signal.

If the number stored in the vote register 28 is less than that stored in the threshold register 29, then the comparator 30 causes the RDC to be reloaded with the predetermined starting value. In this way the initial number of IRQ signals will be tried again in the event of a future fault.

In this way, the DRM module 25 provides a means by which in the event of a fault occurring in the microprocessor 5, the CPU 10 can be reset remotely by the other microprocessors of the system via the system bus 7. This provides the possibility for the fault to be rectified in the event that the CPU 10 is unable to rectify the fault itself It will be appreciated that alternative embodiments to the one described above are possible. For example, the protocol defining the time divided slots could be different from that described above. In particular, each node could be arranged to write status information relating to a particular node to the same DRM packet slot, such that each DRM slot contains status information for just one node.

Furthermore, the RDC count could be any number, including 1. In this case the first occurrence of the threshold value being exceeded will result in a RESET signal, in which case the IRQ signal and line need not be implemented.

We claim:

1. A processor module arranged to be coupled to a communications network having a plurality of distributed modules, the plurality of distributed modules being arranged to transmit status signals, the processor module comprising:
   a processing unit; and
   control circuitry coupled to the network and the processing unit, the control circuitry storing the status signals, each of which has a value indicating a perceived functioning status of the processor module by a predetermined one of the plurality of distributed modules, the control circuitry providing an interrupt request signal to the processing unit in response to the status signals satisfying an interrupt request condition, and providing a reset signal to the processing unit to reset the processor module in dependence upon a reset condition,
   wherein the interrupt request condition is determined by a voting scheme applied to the status signals received from the plurality of distributed modules.

2. The processor module of claim 1, wherein the status signals comprise indications from the plurality of distributed modules as to whether the processor module appears to be faulty.

3. The processor module of claim 2, wherein the voting scheme comprises a summation of the indications and a comparison of the summation of the indications with a threshold value in order to determine whether the reset condition is met.

4. The processor module of claim 1, wherein the interrupt request signal has a value that is determined according to the voting scheme.

5. The processor module of claim 4, wherein the reset condition is determined in dependence upon a predetermined number of interrupt request conditions being met.

6. The processor module of claim 1, wherein the interrupt request signal is non-maskable.

7. The processor module of claim 1, further arranged to provide additional status signals to the communications network indicating the perceived status by the processor module of the plurality of distributed modules.

8. A method of resetting a processor module, the processor module arranged to be coupled to a communications network having a plurality of distributed modules, the method comprising:

receiving status signals from the plurality of distributed modules pertaining to the perceived functioning status of the processor module;

storing the status signals in the processor module;

applying a voting scheme to the status signals to determine whether an interrupt request condition is met;

applying an interrupt request to a processing unit of the processor module when the interrupt request condition is met; and, providing a reset signal to reset the processing unit of the processor module in dependence upon a reset condition being met.

9. The method of claim 8, wherein the status signals comprise a single bit indication from each of the plurality of distributed modules as to whether the processor module appears to be faulty.

10. The method of claim 8 wherein the voting scheme comprises a summation of the status signals and a comparison of the summation of status signals with a threshold value in order to determine whether the interrupt request condition is met.

11. The method of claim 8, wherein each of the status signals is contained in a predetermined field of multiple-field data communicated among the plurality of distributed modules of the communications network.

12. The method of claim 8 wherein the reset condition is determined in dependence upon a predetermined number of interrupt request conditions being met.

13. The method of claim 8, wherein the interrupt request is non-maskable.

14. The method of claim 8 further comprising the processor module providing additional status signals to the communications network indicating the perceived status by the processor module of the plurality of distributed modules.

* * * * *